Aug. 11, 1931.  R. W. BRIGGS ET AL  1,818,457
SUBGRADING MACHINE
Filed May 3, 1930    4 Sheets-Sheet 1
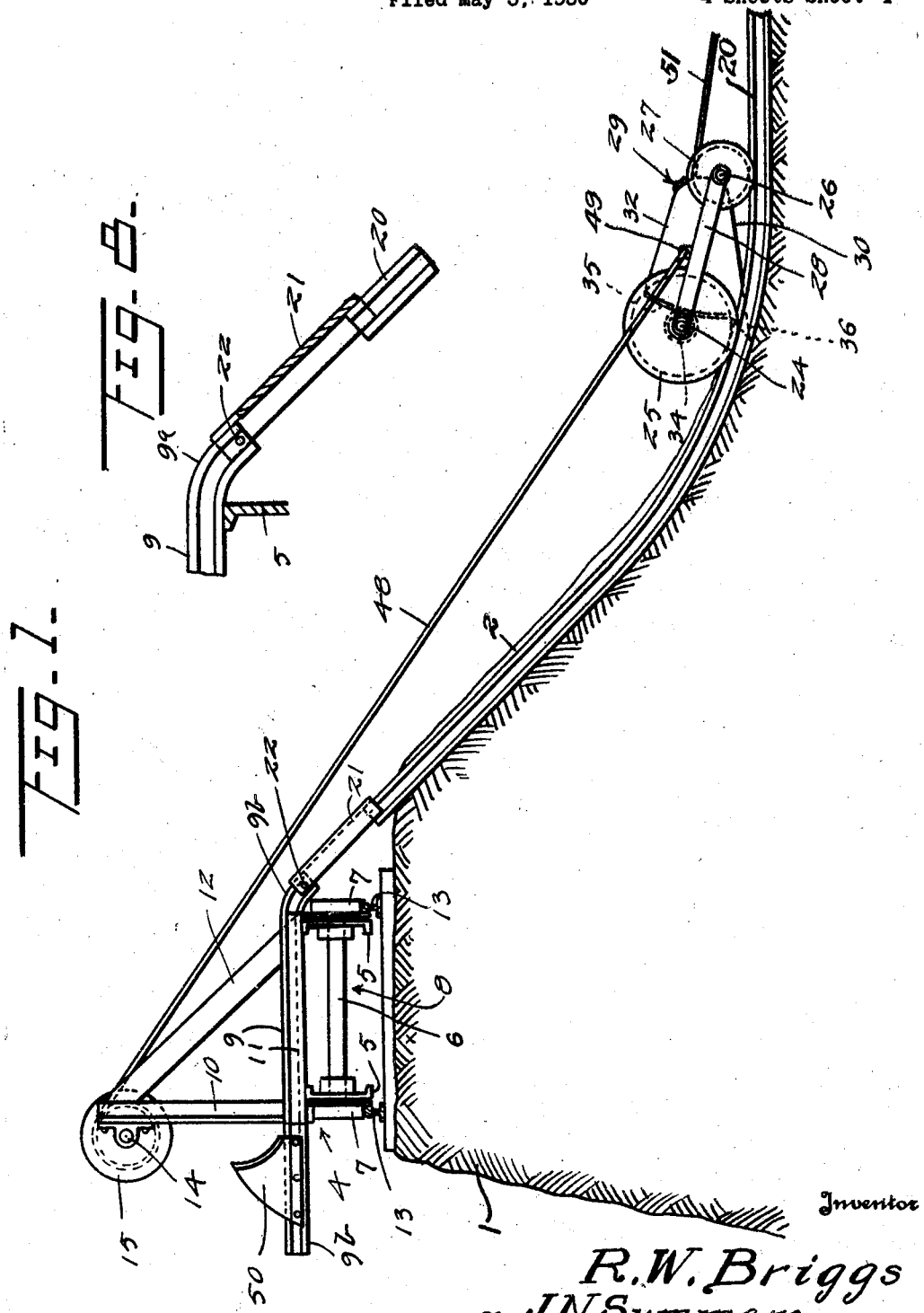
Inventor
R. W. Briggs
J. N. Summers
By Watson E. Coleman

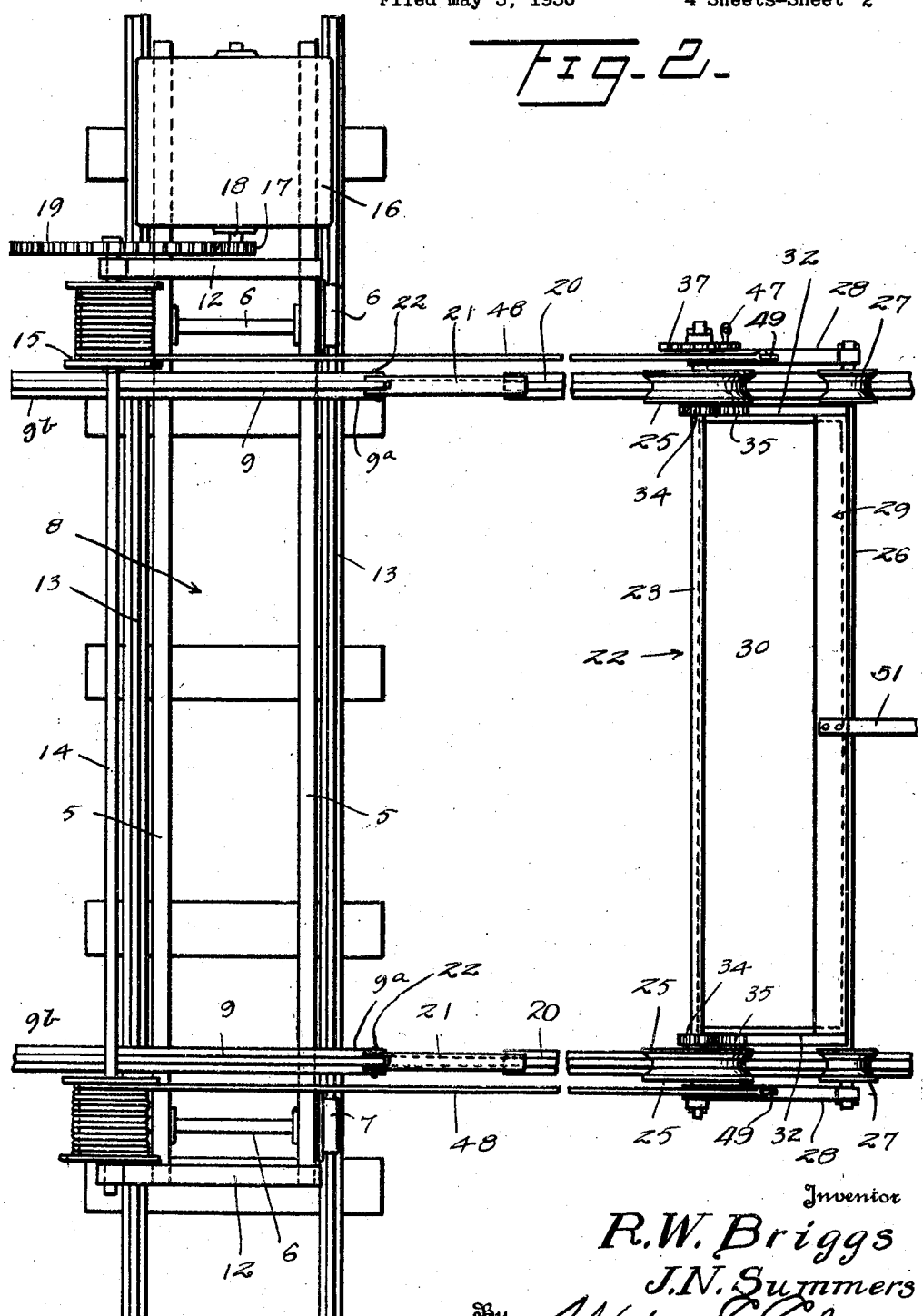

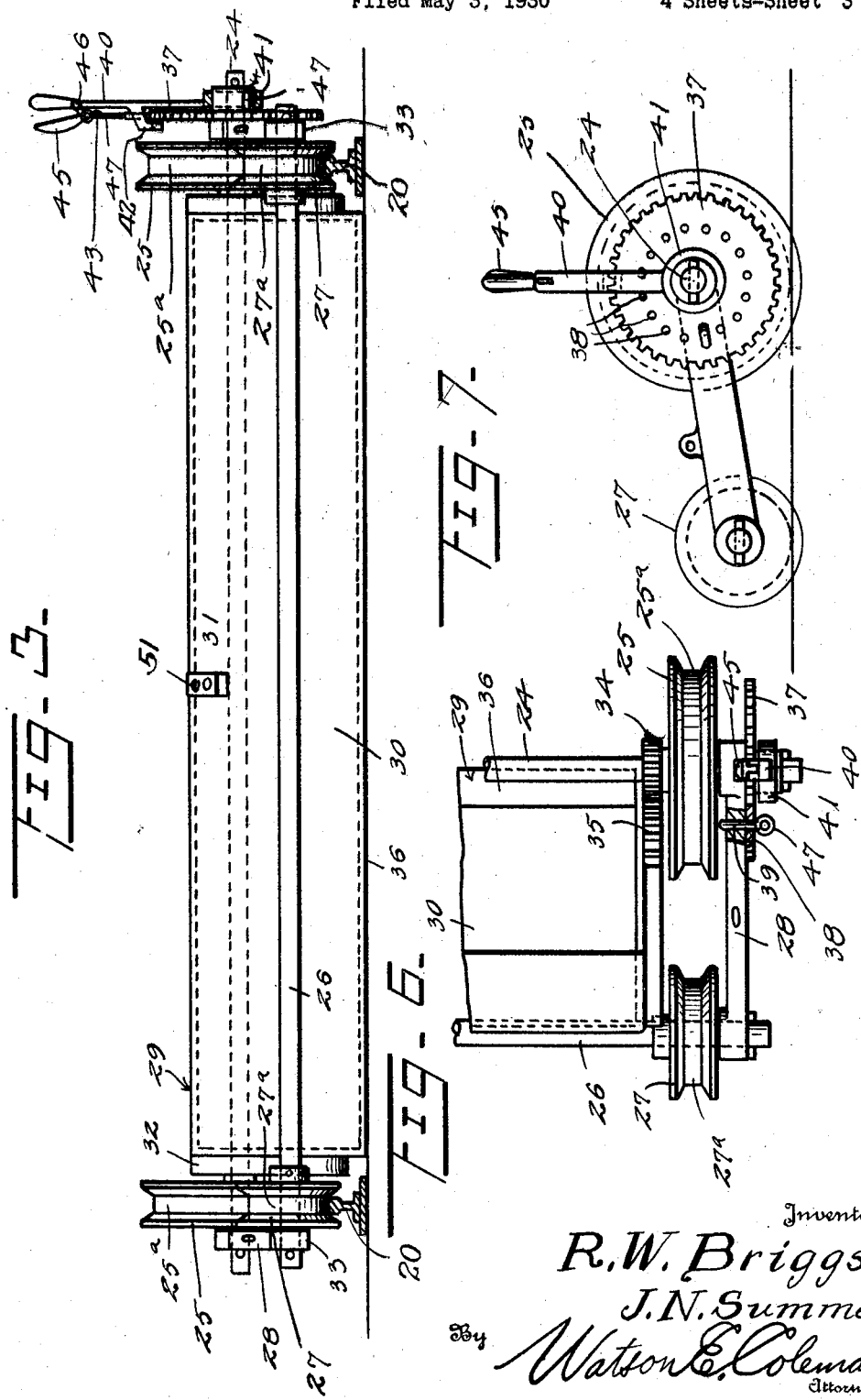

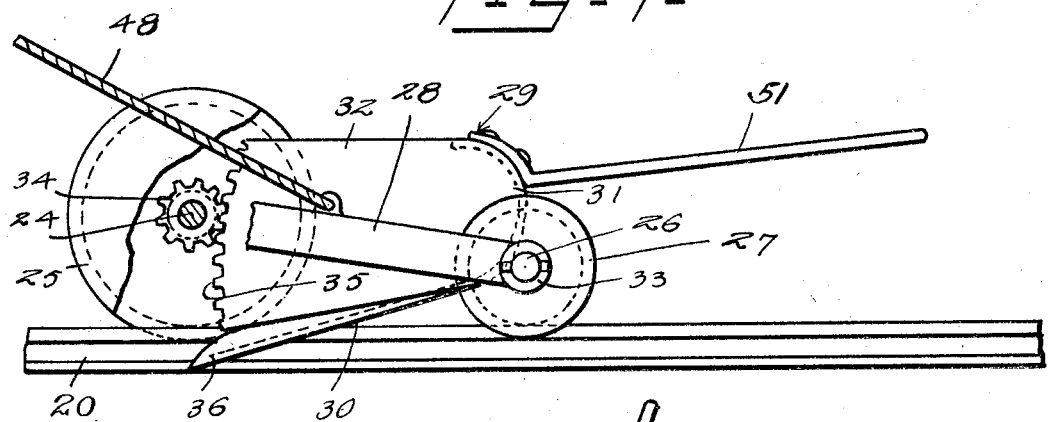
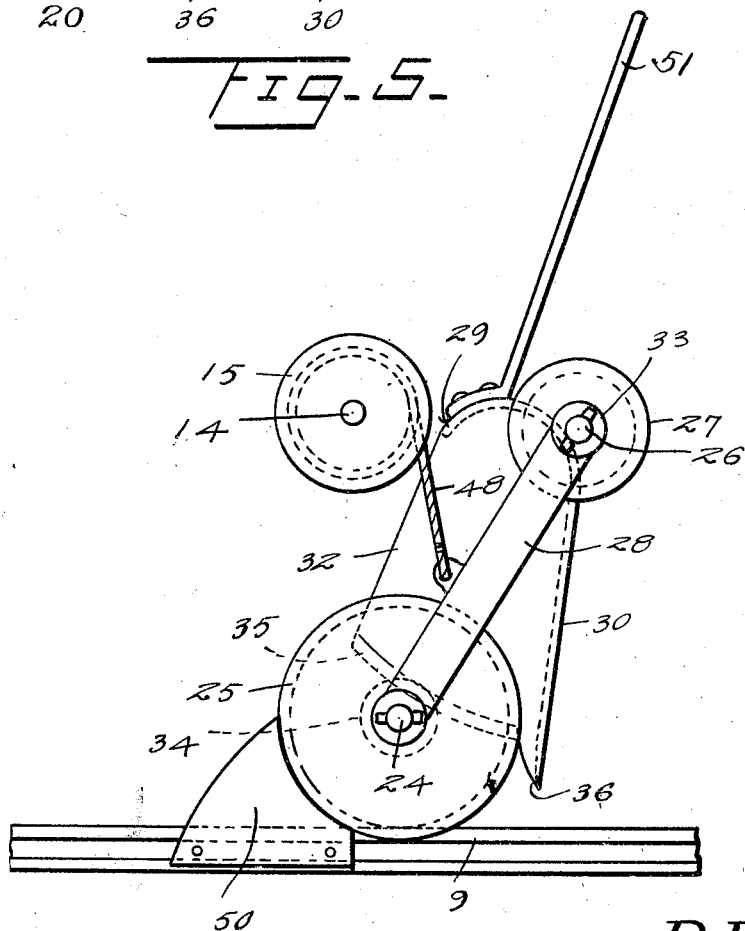

Patented Aug. 11, 1931

1,818,457

UNITED STATES PATENT OFFICE

ROBERT W. BRIGGS AND JOE N. SUMMERS, OF PHARR, TEXAS

SUBGRADING MACHINE

Application filed May 3, 1930. Serial No. 449,480.

This invention relates to grading machines, and has for one of its objects to provide a machine of this character through the medium of which irrigation and other canals, embankments, roads, streets and the like may be finely sub-graded to prepare them for the placement of concrete linings.

To attain the foregoing and other objects, the nature of which will appear as the description proceeds, the invention comprehends the provision of a grading machine which shall embody a truck adapted for movement in a path located at the side of and parallel to the axis of the canal or the like to be sub-graded, rails carried by the truck at right angles to said axis and extending therefrom into the canal or the like, a scraper carried by wheels mounted on the rails, means carried by the truck for moving the scraper along the rails in the direction of the truck, and means for dumping the scraper when it reaches a position above the truck.

The invention further comprehends the provision of a grading machine of the character stated wherein those portions of the rails extending into the canal or the like shall be adapted to be set to determine the grade to which the canal or the like is to be brought.

The invention further comprehends the provision of a grading machine of the character stated wherein the scraper shall be adjustable with respect to the axes of its wheels so as to permit its cutting depth to be regulated and controlled.

The invention has for a still further object to provide a grading machine of the character stated wherein the means for adjusting the cutting depth of the scraper shall be of such construction as to permit such adjustment to be made easily and quickly.

The invention is hereinafter fully described and claimed, and illustrated in the accompanying drawings, wherein:

Figure 1 is a view partly in elevation and partly in vertical section illustrating the manner in which the machine is employed to sub-grade a canal;

Figure 2 is a top plan view of the machine;

Figure 3 is a view in rear elevation of the scraper of the machine;

Figure 4 is a view partly in vertical section and partly in end elevation of the scraper in loading position;

Figure 5 is a view in end elevation of the scraper in dumping position;

Figure 6 is a view partly in top plan and partly in horizontal section of an end portion of the scraper;

Figure 7 is a view in end elevation of the the scraper supporting truck, and

Figure 8 is a view partly in side elevation and partly in vertical section illustrating the manner in which the truck and grading rails are connected together.

The machine is illustrated in relation to a canal to be sub-graded so as to prepare it for the placement of a concrete lining. 1 designates one of the embankments of the canal, 2 the inner side of the embankment, and 3 the bottom of the canal.

The machine comprises a truck 4 which may be of any well known or appropriate construction and is shown as embodying side beams 5, axles 6 journaled in the beams, and flanged wheels 7 secured to the axles. The truck 4 is adapted to be supported upon the embankment 1 by a narrow gauge track 8 for movement parallel to the axis of the canal. Rails 9, which are mounted upon and secured to the beams 5, extend transversely of the truck 4. The rails 9 extend beyond the inner and outer sides of the truck 4, and have their inner end portions 9$^a$ extended downwardly and inwardly and their outer end portions 9$^b$ horizontally arranged. Standards 10 which are located at the outer side of the truck 4 and forwardly and rearwardly beyond the rails 9, are carried by cross bars 11 which rest upon and are secured to the beams 5. The standards 10 are secured to the outer ends of the cross bars 11, and are braced by bars 12 which extend from their upper ends to the inner ends of the cross bars. A shaft 13 extends longitudinally of the truck 4, and is journaled in bearings 14 which are secured to the outer sides of the standards 10 near the upper ends of the latter. Drums 15 are fixed to the shaft 13 forwardly and rearwardly of the rails 9.

A power plant 16 of any well known or appropriate construction is mounted upon the truck 4, and any suitable manually controlled means, not shown, may be employed for the purpose of establishing an operative connection between the power plant and one of the axles 6 in order to permit the truck to be advanced from time to time along the track 8. The power plant 16 is connected to the shaft 13 in order to permit the rotation of the drums 15 thereby. The means for establishing driving connection between the power plant 16 and the shaft 13 may be of any well known or appropriate construction, and is shown as embodying a pinion 17 fixed to the shaft 18 of the power plant and a gear 19 fixed to the shaft 13 and meshing with the pinion. This means will also include means, not shown, which will permit the operation of the shaft 13 to be manually controlled.

Rails 20 conforming to the grade to which the side 2 and bottom 3 of the canal are to be brought, extend across these parts of the canal at right angles to the axis of the latter. The rails 20 are alined with the rails 9 and are connected to the down-turned ends 9ª of the latter by bridge or coupling rail sections 21 which are of channel formation and embrace the adjacent ends of the rails. The rail sections 21 have their upper ends pivotally connected as at 22, to the down-turned ends 9ª of the rails 9, and have their lower ends removably associated with the upper ends of the rails 20. The rails 20 are let into the side 2 and bottom 3 of the canal to a depth equal to that to which these parts are to graded to the end that the bottoms thereof may be used as guides for the setting of the grade.

A scraper supporting truck 23 is mounted for movement along the grade rails 20 and truck rails 9. The truck 23 comprises a front axle 24, front wheels 25 loose on the axle, a rear axle 26, and rear wheels 27 loose on this axle. The axles 24 and 26 are connected at their ends by bars 28 in which they are journaled. The front wheels 25 are larger diametrically than the rear wheels 27 and both the front and the rear wheels are peripherally grooved, as at 25ª and 27ª, respectively, for the reception of the heads of the rails 20 and 9.

The scraper 29 of the fresno type is carried by the truck 23 between the axles 24 and 26, and extends from a point close to one of the grade rails 20 to a point close to the other of these rails. The scraper 29 which comprises a bottom wall 30, rear wall 31 and end walls 32, is pivotally connected, as at 33, to the rear axle 26, and is connected to the front axle 24 by pinions 34 fixed to this axle and rack teeth 35 fixed to the front edges of the end walls 32 of the scraper. The rack teeth 35 constantly mesh with the pinions 34 and are arranged in the arc of a circle having the shaft 26 for its center. The cutting edge 36 of the scraper 29 extends downwardly and forwardly from the bottom 30 of the scraper, and the rack teeth 35 extend upwardly from the cutting edge.

The pinions 34 and rack teeth 35 provide means through the medium of which the scraper 29 may be rocked upwardly and downwardly upon the axle 26 so as to regulate the depth of the penetration of the ground by the cutting edge 36 of the scraper.

A ratchet wheel 37 is fixed to one end of the shaft 24 outwardly of the adjacent wheel 25 and bar 28, and is provided with an annular series of openings 38 which register respectively as the ratchet wheel is turned with an opening 39 in said bar. A lever 40 is pivoted at one end upon the hub 41 of the ratchet wheel 37. The lever 40 is located at the outer side of the ratchet wheel 37 and is provided at its inner side with a hook 42 which embraces the periphery of the ratchet wheel. A spring pressed dog 43 is slidably carried by the hook 42 for movement into and out of engagement with the peripheral teeth of the ratchet wheel, and is adapted to be moved into and out of engagement with the teeth through the medium of a finger lever 45 which is pivotally connected, as at 46, to the lever 40 and to which the dog is pivotally connected, as at 47. The ratchet wheel 37, lever 40 and dog 43 provide means through the medium of which the shaft 24, and consequently the pinions 34 may be turned when it is desired to raise or lower the cutting edge 36 of the scraper 29, it being understood that the cutting edge is raised and lowered with respect to the grade set by the bases of the rails 20. A pin 47 passing through one of the openings 38 and through the opening 39, serves to secure the scraper 29 in its adjusted position.

Cables 48 are secured to and wound about the drums 15, and are secured, as at 49, to the scraper truck bars 28 at the upper sides of said bars and centrally between the ends thereof. The rails 9 are provided outwardly beyond the truck 4 with stops 50 with which the scraper truck wheels 25 contact to limit the movement of this truck in an outward direction on these rails.

When the wheels 25 contact with the stops 50, the front end of the scraper 29 is located laterally beyond the side of the truck 4, and the stops constitute fulcrums about which the scraper and its truck may be rocked to effect the discharge of the load of the scraper outwardly beyond the canal embankment.

In practice, the truck 4 is moved to the required place alongside of the canal or the like to be graded, and after this has been done, the rails 20 are let into the bottom or side of the canal or the like to a depth corresponding to the depth of the ground to be removed to effect the grading operation. The coupling rail sections 21 are then swung into engagement with the upper ends of the grade rails 20. The scraper carrying truck 23 is then moved off the truck rails 4 onto the grade rails 20 to position the scraper at the point where the grading is to be started. The scraper 29 is then adjusted to position its cutting edge 36 at the proper position with respect to the bases of the grade rails 20, and after this has been done, the drums 15 are rotated to move the scraper carrying truck 23 upwardly on the grade rails 20 and outwardly on the truck rails 9. When the scraper carrying truck rails 25 contact with the stops 50, the continued motion of the drums 15 will swing the truck 23 and scraper 29 about the stops as fulcrums with the result that the load of the scraper will be dumped to the outer side of the embankment upon which the truck 4 is mounted. If desired, the dumping of the scraper 29 may be effected through the medium of a handle 51 secured to and extending rearwardly from the rear wall of the scraper.

It should be apparent from the foregoing description, taken in connection with the accompanying drawings, that the machine permits the fine sub-grading of canals and the like, and that it permits the work to be done in a comparatively short time with the assistance of comparatively little manual labor. It should also be understood that the sub-grading machine is simple and durable, that it may be manufactured and sold at a comparatively low cost, and that it may be maintained in a high state of efficiency at comparatively low cost.

While we have described the principle of the invention, together with the structure which we now consider the preferred embodiment thereof, it is to be understood that the structure shown is merely illustrative and that such changes may be made, when desired, as fall within the scope of the invention as claimed.

We claim:—

1. A grading machine, comprising a truck, rails extending across the truck, grade setting rails alined with said first rails, a truck movable along the rails, a scraper carried by said second truck, and hauling means carried by said first truck and connected to said second truck.

2. A grading machine, comprising a truck, rails mounted transversely upon the truck with their ends extended beyond the inner and outer sides of the truck, the outer ends of the rails being horizontally arranged and the inner ends of the rails being downturned, stops secured to the outer ends of the rails, grade setting rails alined with said first rails and embodying substantially horizontal portions and upwardly inclined positions, coupling rails sections pivotally secured to the downturned ends of said first rails and engaged with the upper ends of said second rails, a truck movable along the rails, a scraper carried by said second truck, and hauling means carried by said first truck and connected to said second truck.

3. A grading machine, comprising a truck, rails extending across the truck, grade setting rails alined with said first rails, a truck movable along the rails, a shaft mounted upon and extending longitudinally of said first truck, drums secured to the shaft, cables wound about the drums and secured to said second truck, and a scraper carried by said second truck.

4. A grading machine, comprising a truck, rails extending across the truck, grade setting rails alined with said first rails, a truck movable along the rails, a shaft mounted upon and extending longitudinally of said first truck, drums secured to the shaft, cables wound about the drums and secured to said second truck, a scraper adjustably mounted upon said second truck, and means for adjusting the scraper and securing it in adjusted position.

In testimony whereof we hereunto affix our signatures.

ROBERT W. BRIGGS.
JOE N. SUMMERS.